April 30, 1940.  F. W. SLACK  2,198,680
MOTOR VEHICLE
Filed March 17, 1938   2 Sheets-Sheet 1

INVENTOR
FREDERIC W. SLACK
BY
Harness, Dind, Patee & Harris
ATTORNEYS.

April 30, 1940.   F. W. SLACK   2,198,680
MOTOR VEHICLE
Filed March 17, 1938   2 Sheets-Sheet 2
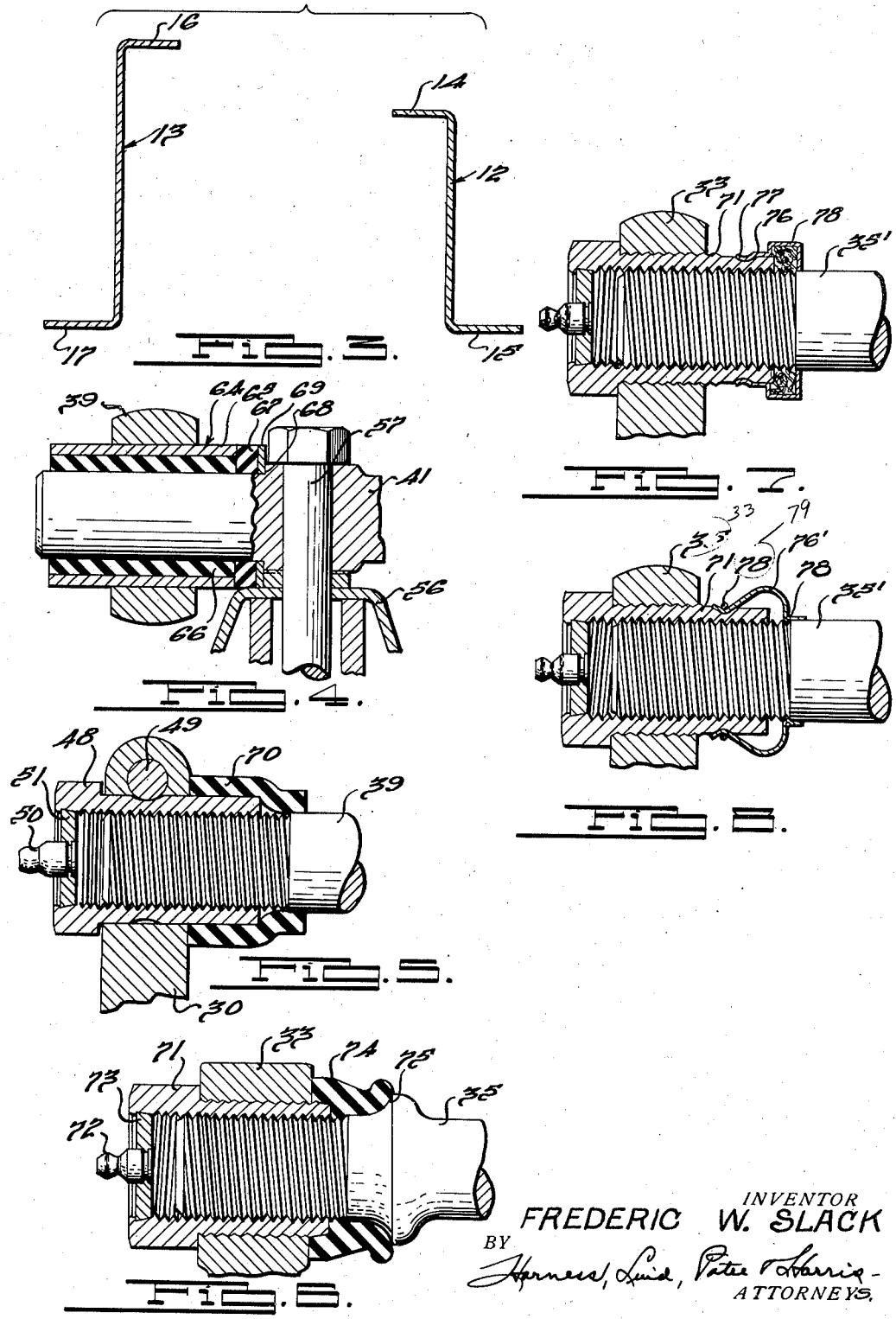
INVENTOR
FREDERIC W. SLACK
BY
ATTORNEYS.

Patented Apr. 30, 1940

2,198,680

UNITED STATES PATENT OFFICE 2,198,680

MOTOR VEHICLE

Frederic W. Slack, Detroit, Mich., assignor to Chrysler Corporation, Highland Park, Mich., a corporation of Delaware Application March 17, 1938, Serial No. 196,349

7 Claims. (Cl. 180—64)

This invention relates to motor vehicles and refers more particularly to vehicle chassis construction.

The invention is illustrated and described in connection with the steerable ground wheels of the independent suspension type although in its broader aspects many of the features of the invention may be applied to other types of suspension and also to the non-steering ground wheels such as the rear wheels of a motor vehicle.

One of the objects of the invention is to provide a relatively simple wheel suspension of the character referred to, capable of manufacture at relatively low cost; a suspension having improved characteristics of operation and durability; and a suspension adapted for assembly in an improved manner and method.

Another object of the invention is to provide an improved chassis frame cross member for connecting the chassis side rails, the cross member preferably comprising a pair of supports of strip metal stock such, for example, as may be formed by a stamping operation; to provide cross support members of this type having the characteristics of minimum weight and maximum resistance to stresses and strains; to provide improved means for tying the supports together, which means provides an improved support for a part of the vehicle cooling system, such as the radiator, and also for the front end of the vehicle motor.

A still further object of the invention is to provide a vehicle chassis frame having improved characteristics of manufacture and operation particularly adapted for the independently sprung type of wheel suspension. More particularly in this respect the invention has for its object the provision of improved means for mounting the wheel supporting and guiding means relative to the frame structure.

Another object of the invention is to provide an improved construction and arrangement of linkages of the type especially adapted for a suspension of the foregoing type and more particularly to provide a construction and arrangement of linkages which will effectively and efficiently withstand braking reaction. In carrying out the objects of the invention, one of the linkages preferably terminates in an end portion extending forwardly of the vehicle so that the braking reaction tends to push the linkage bushing onto the linkage instead of off.

A further object of the invention is to provide improved means for sealing the articulated connections between relatively movable parts of a suspension system for the purpose of preventing foreign matter gaining access to such connections and to prevent the escape of lubricant therefrom. The sealing means is preferably yieldable and will not deteriorate in the presence of lubricants or greases.

Further objects and advantages of the invention will be more apparent from the following description taken in connection with the accompanying drawings, in which:

Fig. 3 is an enlarged sectional view taken on the line 3—3 of Fig. 2.

Fig. 4 is an enlarged sectional view taken on the line 4—4 of Fig. 2.

Fig. 5 is an enlarged sectional view taken as indicated by the line 5—5 of Fig. 1.

Fig. 6 is an enlarged sectional view taken on the line 6—6 of Fig. 2.

Figs. 7 and 8 are enlarged sectional views similar to Fig. 6 but illustrating modified forms of the seal shown therein.

Figure 1:
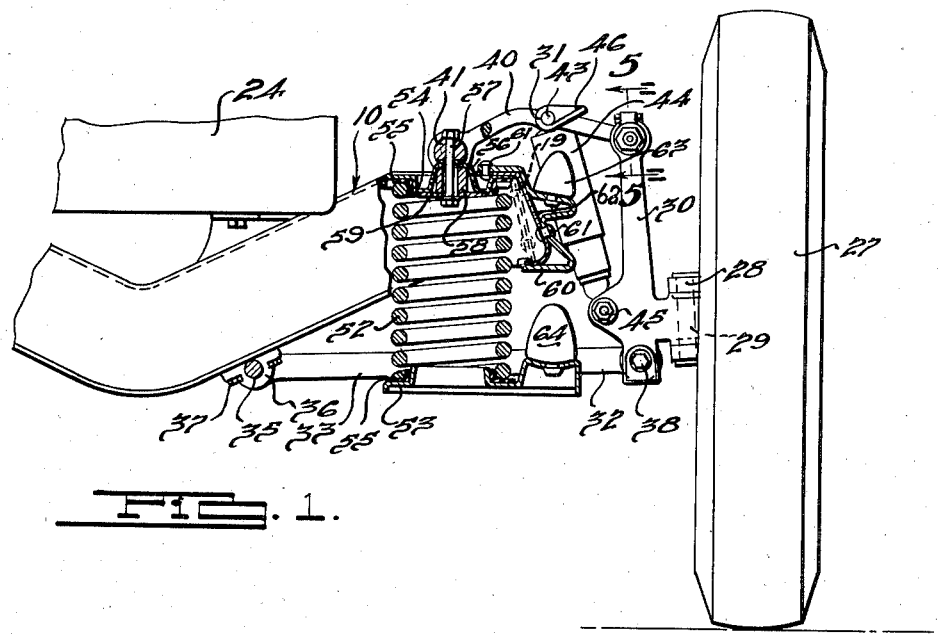
Fig. 1 is a front elevational view, partly in section, of a typical side portion of the front end of a vehicle illustrating the improved chassis construction.

According to the illustrated embodiment of the invention the motor vehicle is provided with a frame structure generally indicated at 10 having longitudinally extending transversely spaced side rails preferably of channel-shape, one of which is shown at 11. The side rails are connected adjacent the forward end of the frame by adjacently disposed cross members 12 and 13, each of which is substantially Z-shaped in cross section as is illustrated more particularly in Fig. 3. The cross members are preferably sheet metal stampings in the interest of lightness in weight and economy in manufacture, although the invention in its broader aspects is not limited to the particular type of metal nor the method utilized in forming these members.

The member 12 has oppositely extending flanges 14 and 15 at the top and bottom thereof and the member 13 is provided with similar flanges 16 and 17. A portion of the member 12 is deformed downwardly to accommodate the engine oil pan (not shown), but otherwise the members 12 and 13 are of equal height throughout the length thereof. As is more particularly shown in Fig. 2, an end portion of the cross members extends into the adjacent side rail 11, the upper flanges 14 and 16 thereof being riveted as at 18 or otherwise secured to the upper flange of the channel side rail and the lower flanges 15 and 17 are similarly secured to the lower flange of the latter. The web of each cross member is angularly deformed to lie adjacent the web of the side rail and is riveted as at 19 or otherwise suitably secured thereto. The cross members 12 and 13 are connected intermediate their ends by a pair of tying strips, preferably of sheet metal, one of which is shown at 20. The strip 20 is riveted to the upper flanges 14 and 16 of the cross members 12 and 13, as illustrated at 21 and 22 respectively and has a portion thereof extending forwardly of the cross member 13 and a reverse bent end portion secured to the lower flange 17 of the latter cross member. In addition to forming a tie between the cross members, the strips 20 serve as a front support means for the vehicle power plant, a portion of which is illustrated at 23, and for the radiator of the cooling system, a portion of which is illustrated at 24. The engine is supported by the tie strip 20, as illustrated at 25, while the radiator 24 is adapted to be bolted or otherwise secured to the strip as illustrated at 26 in Fig. 2.

A front steerable rod wheel 27 is independently suspended for relative upward and downward movement with respect to the frame structure 10 and with respect to the remaining road wheels of the vehicle by supporting and guiding mechanism comprising a steering knuckle 28 having a spindle (not shown) on which the wheel 27 is journalled. The steering knuckle 28 is pivotally connected by a king pin 29 with the generally vertically extending knuckle bracket support arm 30. The latter is articulated or pivoted at its upper and lower ends respectively with the upper and lower laterally extending linkages 31 and 32 of the suspension, the linkages and bracket support arm 30 constituting relatively movable wheel support and guiding members.

The lower linkage 32 includes a pair of arms 33 and 34 having their inner ends articulated with a shaft 35 having lateral extensions secured to the lower flanges 15 and 17 of the cross members 12 and 13 by means of bolts 37. In addition to connecting the arms of the lower linkage to the frame structure, the shaft 35 serves as a means for transversely connecting and bracing the cross members 12 and 13. The connection between the arms 33, 34 and shaft 35 will be more particularly described in connection with the showing in Fig. 6. The arms 33 and 34 converge outwardly and are articulated with the lower end portion of the knuckle bracket 30 by a connector 38 in a manner to permit relative movement between the lower linkage and the bracket 30.

The upper linkage 31 includes arms 39 and 40 having diverging inner ends pivotally supported from the frame structure by a shaft 41 extending through aligned eyes in the arms. The articulated connection between the shaft 41 and the arms will be more particularly described in connection with the showing in Fig. 4. The converging intermediate portions of the arms as illustrated at 42 are secured together by a connector 43 having an outboard end portion to which one end of a shock absorber 44 is articulated, the other end of the latter being articulated with the knuckle bracket 30 at 45. The arm 40 terminates intermediate the ends of the arm 39, in a flattened portion 46 for engaging a jounce bumper, as will hereinafter appear. The arm 39 extends outwardly beyond the termination of the arm 40 and is bowed, as indicated at 47, to terminate in an end portion extending generally longitudinally of the frame structure and forwardly thereof for cantilever-like connection with the knuckle bracket 30.

The articulated connection between the arm 39 of the upper linkage and the bracket 30 is more particularly shown in Fig. 5. The upper end of the bracket 30 terminates in a slit portion having an opening therein in which is received the threaded end portion of the arm 39. An eccentric bushing 48 is disposed in the opening in the bracket and has an internal surface in threaded engagement with the arm 39. The well known camber adjustment for the wheel is obtained through the bushing 48 which is maintained in fixed position of adjustment by a bolt or pin 49. Lubricant is admitted to the engaged surfaces of the bushing and arm through a fitting 50 carried by a closure member 51 in the outer enlarged end of the bushing 48.

Termination of the arm 39 of the upper linkage in a forwardly extending portion for connection with the knuckle bracket 30 is advantageous in that the vehicle braking forces tend to push the bushing 48 on the arm 39 instead of off of the latter, as is the case where the arm 39 terminates in a rearwardly extending portion for connection with the knuckle bracket. This arrangement constitutes a safety feature and minimizes the possibility of disconnecting the upper linkage and knuckle bracket through constant action of the braking forces or a particularly violent reaction from the latter.

Figure 2:
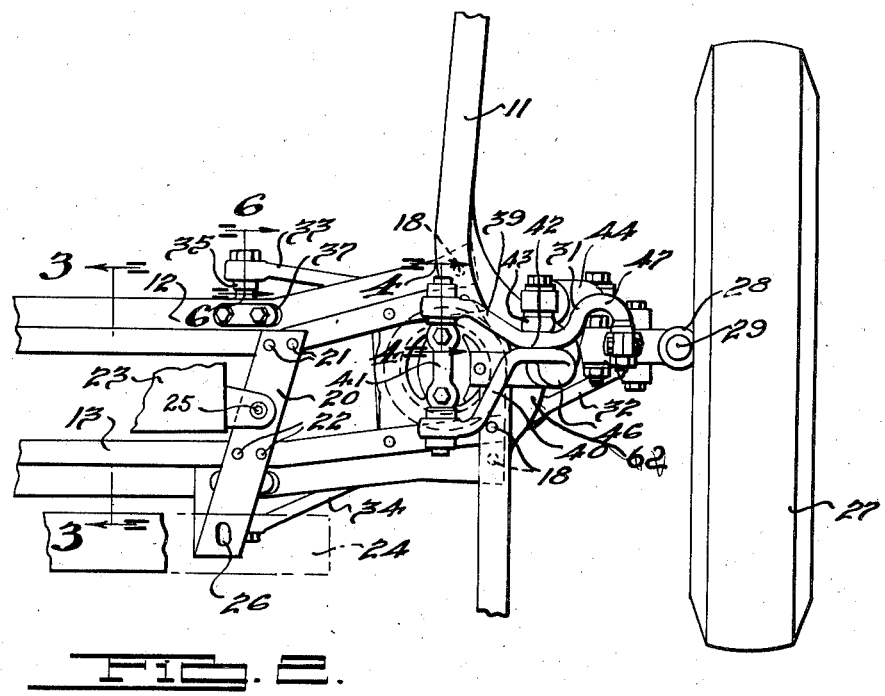
Fig. 2 is a fragmentary top plan view of the chassis construction shown in Fig. 1.

The suspension system includes a pair of laterally spaced weight supporting coil springs, one of which is shown at 52, it being understood that the arrangement shown in Figs. 1 and 2 is duplicated at the opposite side of the vehicle. The lower end of the spring 52 rests upon a seat 53 carried by the lower linkage 32, while the upper end thereof abuts a spring seat plate secured to the undersurface of the upper flanges 14 and 16 of the cross members 12 and 13 and to the upper flange of the side rail 11. Annular insulators or pads illustrated at 55 and preferably comprising rubber are disposed between the spring ends and abutments.

The upper spring seat 54 has a raised central portion or boss 56 to which the connector 41 for the upper linkage 31 is secured by bolts 57. A suitable spacer 58 is disposed between the raised portion 56 and the plate 59 which is retained against the under surface of the plate 54 by the bolts 57. The spring seat 54 preferably comprises a stamping and has sufficient rigidity to support the linkage while utilizing a spring seat as a support. In the manner specified the suspension system is greatly simplified and the necessity for the additional supports heretofore employed for this purpose is eliminated, thus effecting a substantial saving over former arrangements.

An annular bracket 60 is riveted as at 61 or otherwise suitably secured to the frame side rail 11 adjacent the outwardly deformed portion 62 of the latter for accommodating positioning of the spring 52. The bracket 60 carries a jounce bumper 63 adapted to engage the portion 46 of the upper linkage arm 40 for cushioning relative movement between the linkage and frame. A similar bumper 64 is carried by the lower spring seat 53 to engage the bracket 60 to cushion relative movement between the lower linkage and frame.

Referring to Fig. 4 there is shown the connection between the shaft 41 and upper linkage arm 39, it being understood that the connection between the arm 40 of the latter linkage and shaft 41 is similar thereto. The arm 39 has an eye in which is received an end portion of the shaft 41 and which is connected thereto by means of the bushing 64. The latter includes a metallic sleeve preferably having a press fit within the eye, and an inner sleeve 66 of resilient material preferably comprising rubber. The sleeve 66 is preferably under compression between the sleeve 65 and shaft 41 and relative movement between the latter and the linkage is accommodated by deformation of the sleeve 66. An annular washer 67 comprising a resilient material, such as rubber, is disposed between the inner end portion of the bushing 64 and an adjacent shoulder 68 on the shaft 41, sealing the latter end portion of the bushing and preventing foreign matter from gaining access to the interior surfaces of the latter. The washer 67 also spaces and insulates the metallic sleeve 65 of the bushing from the adjacent portion of the arm 41. A metallic annular washer 69 is interposed between the shoulder 68 and washer 67 to maintain the latter in predetermined position although, if desired, the shoulder may be so extended as to eliminate the washer 69. It will be apparent that the resilient washer 67 may be so formed that the resiliency thereof is relied upon to maintain the same in the desired position, with the shoulder serving as a means for preventing displacement of the washer 67 axially with respect to shaft 41.

Referring to Fig. 5 wherein there is illustrated the connection between the arm 39 of the upper linkage and the knuckle bracket 30, the open end of the bushing 48 is closed by a resilient annular sleeve 70 extending axially into overlapping relation with the bushing 48 and arm 30, thus preventing foreign matter from gaining access through the open end of the bushing 48 to the threaded connection between the latter and arm 39. The sleeve 70 is maintained in position by abutting the adjacent end portion of the knuckle bracket 30 and by the bowed portion 47 of the arm 39, as shown in Fig. 2.

In Fig. 6 there is shown the articulated connection between the shaft 35 and arm 33 of the lower linkage, it being understood that the connection between the other arm 34 and latter shaft is the same. The shaft 35 has a threaded end portion extending into an eye of the arm 33 and connected to the latter by a bushing 71 having its outer surface in threaded engagement with the wall of the eye and its inner surface threadedly engaging the shaft and accommodating relative movement between the latter and the lower linkage. Lubricant is admitted to the threadedly engaging surfaces of the bushing and shaft through a fitting 72 carried by a closure 73 for the outer end of the bushing. An annular resilient sealing sleeve 74 has portions thereof overlapping the bushing shaft for preventing foreign matter from gaining access to the threaded surfaces of the joint and for preventing escapement of lubricant therefrom. The sleeve 74 is disposed between the arms 33 and annular shoulders 75 on the shaft, this arrangement preventing axial displacement of the sleeve. The latter encircles and engages the threaded portion of the shaft 35 which is not engaged by the bushing 71 and extends radially inwardly to engage the latter portion of the shaft 35.

The sealing sleeves 70 and 74, as well as the bushing 66 and washer 67 preferably comprise a resilient yieldable material which will not deteriorate in the presence of oil or other lubricants. As an illustrative embodiment, these members may comprise neoprene, formerly called "duprene" and chemically known as polymerized chloprene, the product being manufactured and sold under the above trade names. While this product has rubber-like physical characteristics, its oil and heat-resisting properties are far superior to the corresponding properties of natural rubber, for instance, from which the aforesaid members may be formed if desired.

The following is an illustrative "neoprene" composition which is suitable for the manufacture of the foregoing parts:

| | Parts by weight |
|---|---|
| Neoprene | 100 |
| Magnesium oxide | 10 |
| Zinc oxide | 10 |
| Wood resin | 5 |
| Antioxidant | 1 |
| Sulphur | 1 |
| Carbon black | 20 |
| Brown factice | 30 |

In Figs 7 and 8 there are illustrated modified forms of the seal which may be substituted for the forms shown in Figs. 5 and 6. In Fig. 7 the seal includes an annular metallic housing 76 having a reduced portion 77 resiliently gripping the bushing 71 and an enlarged portion 78 extending axially of the shaft 35' beyond the adjacent end of the bushing receiving the latter shaft. The enlarged portion 78 has a central opening of sufficient size to accommodate the shaft 35' and has disposed therein a quantity of felt or similar material which cooperates with the housing to prevent escapement of lubricant from the joint as well as to prevent entry of foreign matter thereto.

In the embodiment of the invention illustrated in Fig. 8 the seal includes a metallic housing 76' which resiliently grips the outer surface of the shaft 35' and bushing 71 adjacent the open end of the latter which receives the threaded end of the shaft. The housing is further maintained in predetermined position and in engagement with the bushing and shaft by wires 79 or other suitable means encircling the housing. In this form of the invention the felt or similar material shown in the Fig. 7 embodiment is omitted.

While various forms of the seal have been illustrated as applied to specific connections between the relatively movable wheel support and guiding members, it will be understood that the forms of the seals are interchangeable and the invention is not to be limited to the application of a particular form of seal to a particular connection.

What I claim is:

1. In a motor vehicle including an engine and a heat exchange unit, a frame structure for said vehicle comprising a pair of spaced longitudinally extending side rails, transversely extending means for connecting said side rails comprising a pair of adjacently disposed cross members having end portions secured to said rails, and means for connecting said cross members intermediate their end portions, said last named means forming a support for said heat exchange unit and said motor.

2. In a motor vehicle including an engine and a heat exchange unit, a frame structure for said vehicle comprising a pair of spaced longitudinally extending side rails, transversely extending means for connecting said rails, said means comprising a pair of adjacently disposed sheet metal cross members each having a flanged edge portion, and means for connecting said cross members intermediate their end portions comprising spaced tying strips secured to said flanged portions, said strips forming a support for said heat exchange unit and said motor.

3. In a motor vehicle including a power plant unit and a heat exchange unit, a frame structure including a pair of spaced longitudinally extending side rails, means including a pair of adjacently disposed cross members for connecting said side rails, each of said members having flanged upper and lower edge portions, a road wheel disposed at each side of said frame structure, means structurally connecting each of said wheels and said frame structure for supporting and guiding a respective wheel for rising and falling movement, each of said last named means including a linkage, and means for rigidly connecting said cross members, said connecting means including a pair of spaced plate-like members secured to the flanged upper edge portions of said cross members and forming a support for one of said units, and a pair of spaced arms secured to the flanged lower edge portions of said cross members, said arms having an articulated connection with a respective linkage for supporting the latter relative to said frame structure.

4. In a motor vehicle including a power plant unit and a heat exchange unit, a frame structure including a pair of spaced longitudinally extending side rails, means including a pair of adjacently disposed cross members for connecting said side rails, a road wheel disposed at one side of said frame structure, means structurally connecting said wheel and said frame structure for supporting and guiding said wheel for rising and falling movement, said last named means comprising a linkage, and a plurality of members for connecting said cross members, one of said connecting members forming a support for one of said units relative to said frame structure and another of said connecting members having an articulated connection with said linkage for supporting the latter relative to said frame structure.

5. In a motor vehicle including a frame structure having a pair of transversely spaced longitudinally extending side rails, transversely extending means for connecting said side rails adjacent one end of said frame structure including a pair of adjacently disposed angularly shaped sheet metal cross members having end portions secured to said side rails, and means for connecting said cross members intermediate the ends thereof comprising transversely spaced sheet metal tying strips extending substantially longitudinally of said frame structure.

6. In a motor vehicle chassis, a frame structure including spaced longitudinally extending side rails, means including a pair of adjacently disposed cross members for connecting said rails, each of said cross members having a flanged upper edge portion, a road wheel disposed at one side of said frame structure, means structurally connecting said wheel and frame structure for guiding rising and falling movement of said wheel, said connecting means including upper and lower linkages, a coil spring intermediate said cross members for yieldably supporting said frame structure on said lower linkage, an abutment for one end of said spring secured to the flanged edge portions of said cross members, and means for pivotally attaching the inner end of said upper linkage to said spring abutment.

7. In a motor vehicle chassis, a frame structure including spaced longitudinally extending side rails, means including a pair of adjacently disposed angularly-shaped cross members for connecting said rails, a road wheel disposed at one side of said frame structure, means structurally connecting said wheel and frame structure for guiding rising and falling movement of said wheel, said connecting means including upper and lower linkages, a coil spring intermediate said cross members for yieldably supporting said frame structure on said lower linkage, an abutment for the upper end of said spring secured to said cross members, said abutment having a portion thereof extending vertically beyond the adjacent end of said spring, and means carried by said raised portion for pivotally supporting said upper linkage from said frame structure.

FREDERIC W. SLACK.